Aug. 13, 1935.  A. A. THOMAS  2,010,904
REMOTE CONTROL APPARATUS FOR RADIORECEIVERS
Filed March 24, 1930    9 Sheets-Sheet 1

INVENTOR
Adolph A. Thomas

INVENTOR
Adolph A. Thomas

Aug. 13, 1935.                A. A. THOMAS                2,010,904
               REMOTE CONTROL APPARATUS FOR RADIORECEIVERS
                       Filed March 24, 1930        9 Sheets-Sheet 3
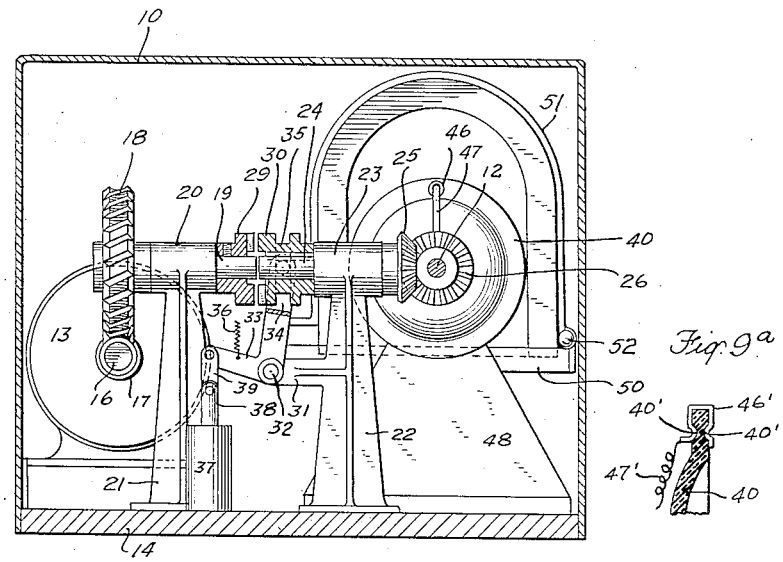
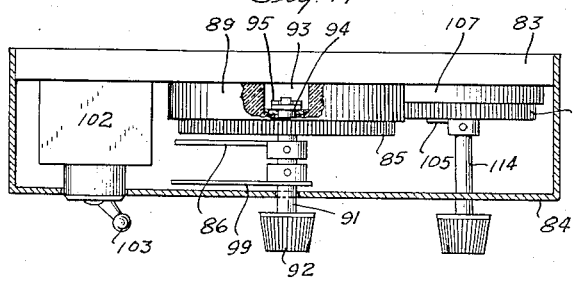
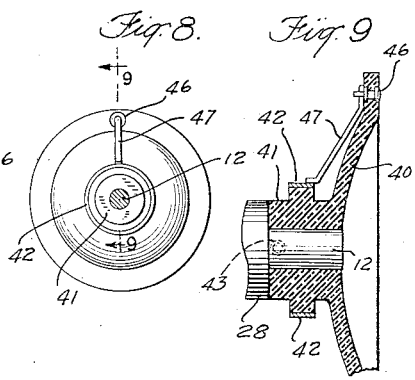
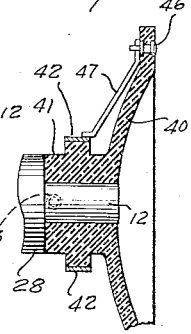
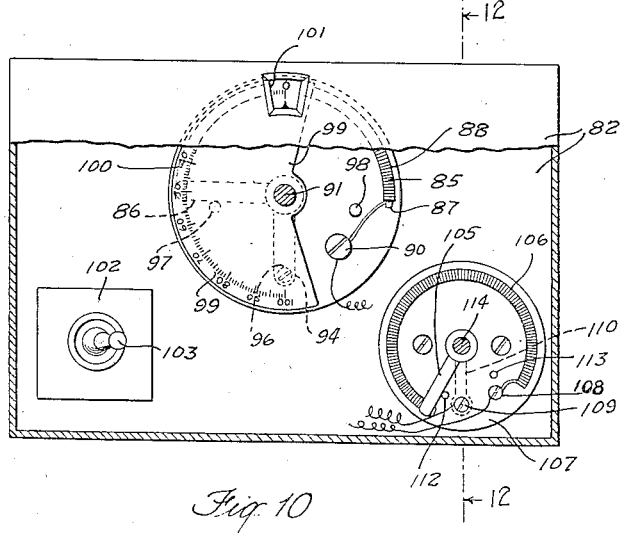
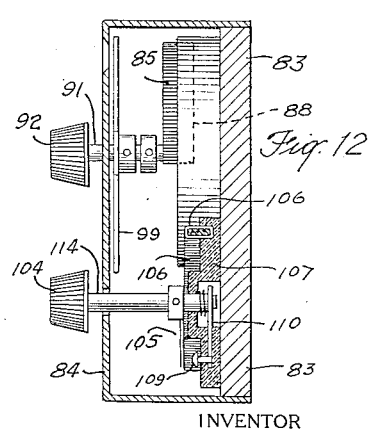
INVENTOR
Adolph A. Thomas Aug. 13, 1935.   A. A. THOMAS   2,010,904
REMOTE CONTROL APPARATUS FOR RADIORECEIVERS
Filed March 24, 1930   9 Sheets-Sheet 4

INVENTOR
Adolph A. Thomas

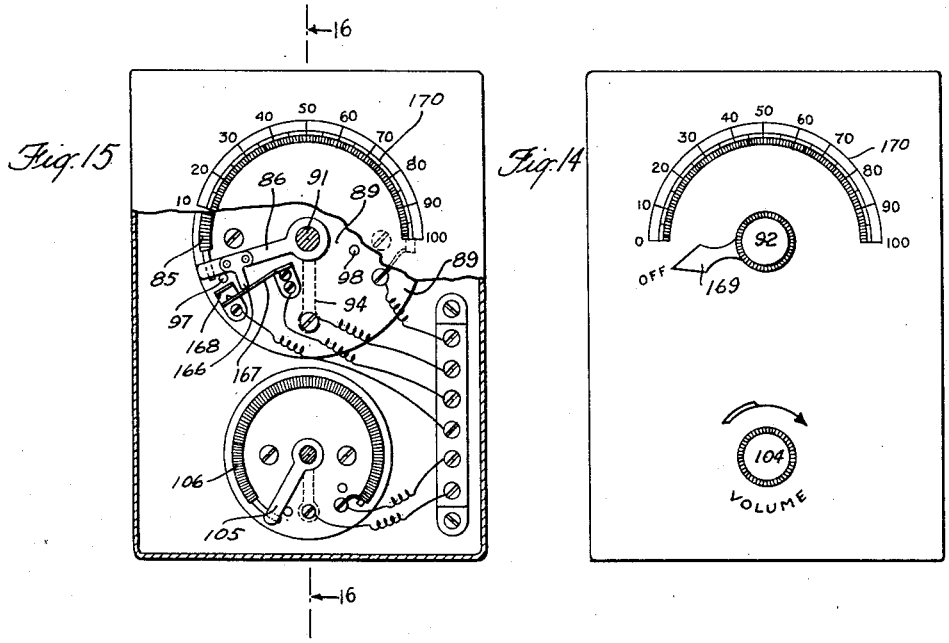
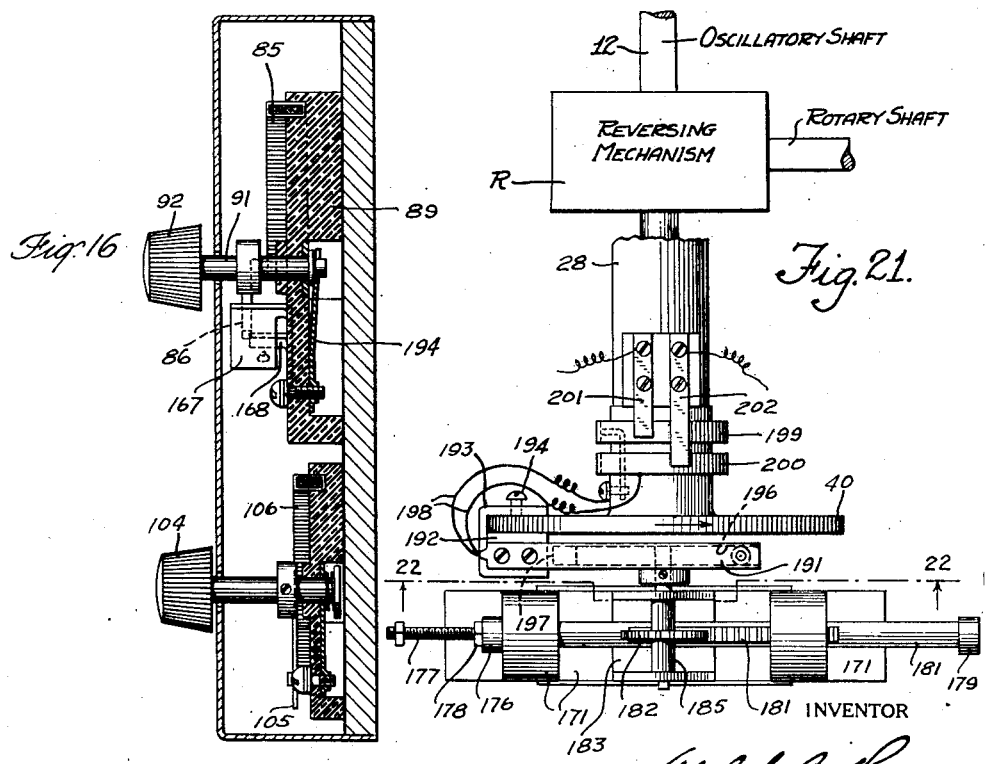

Aug. 13, 1935.  A. A. THOMAS  2,010,904
REMOTE CONTROL APPARATUS FOR RADIORECEIVERS
Filed March 24, 1930   9 Sheets-Sheet 6

INVENTOR
Adolph A. Thomas

Aug. 13, 1935.  A. A. THOMAS  2,010,904
REMOTE CONTROL APPARATUS FOR RADIORECEIVERS
Filed March 24, 1930  9 Sheets-Sheet 7
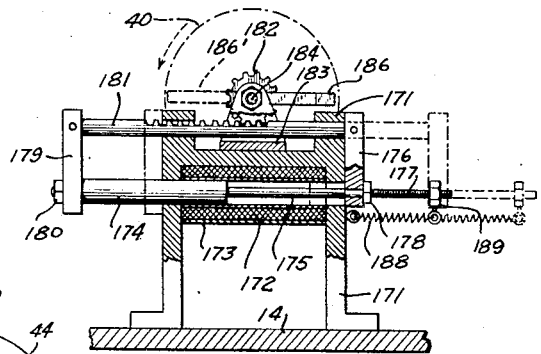
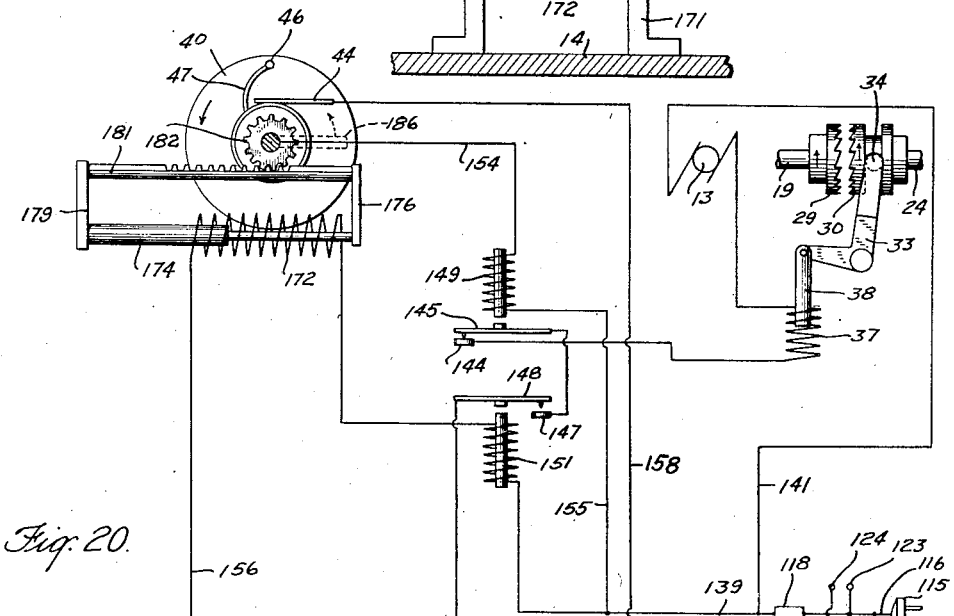
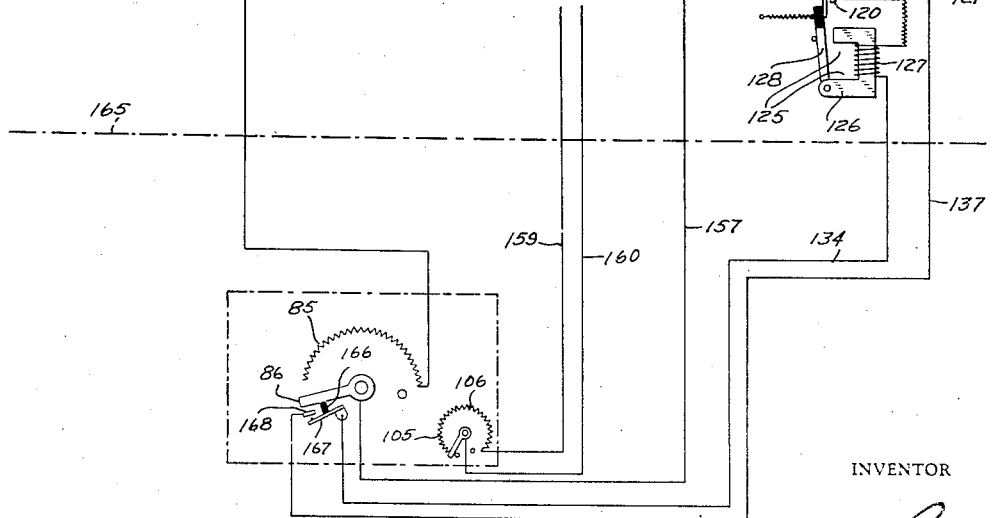
INVENTOR
Adolph A. Thomas Aug. 13, 1935.   A. A. THOMAS   2,010,904
REMOTE CONTROL APPARATUS FOR RADIORECEIVERS
Filed March 24, 1930   9 Sheets-Sheet 8
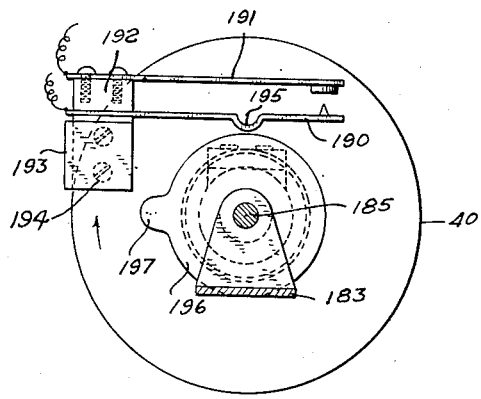
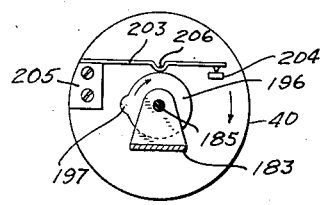
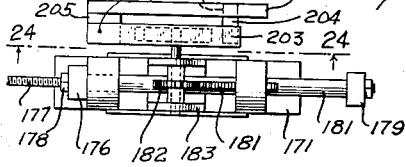
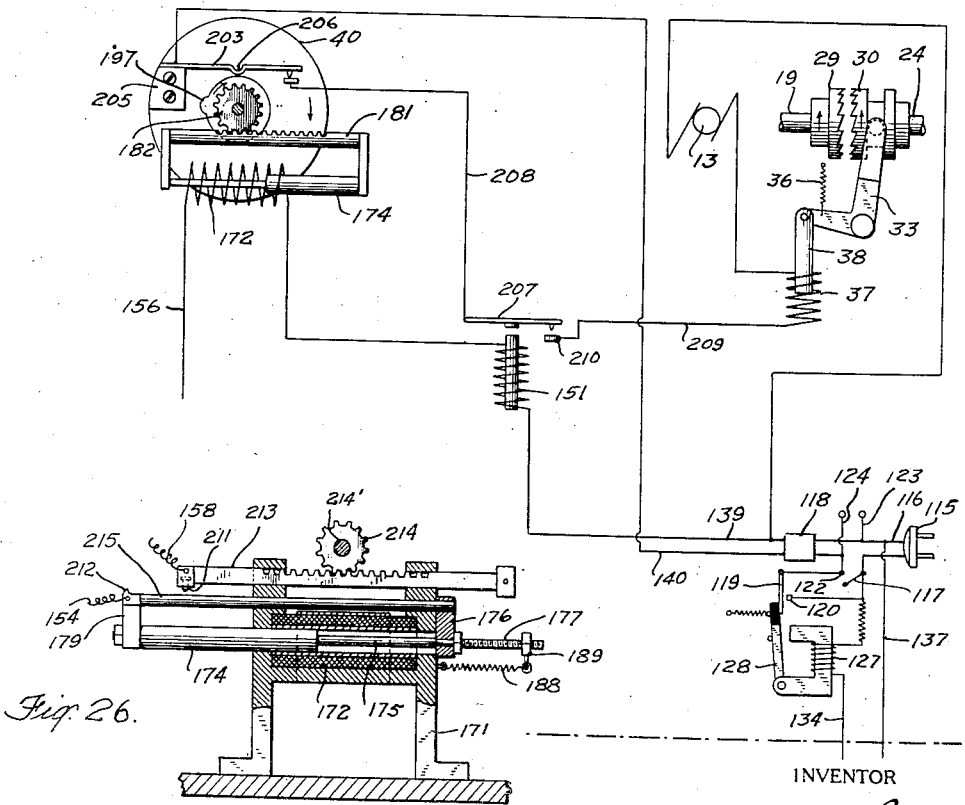
INVENTOR
Adolph A. Thomas

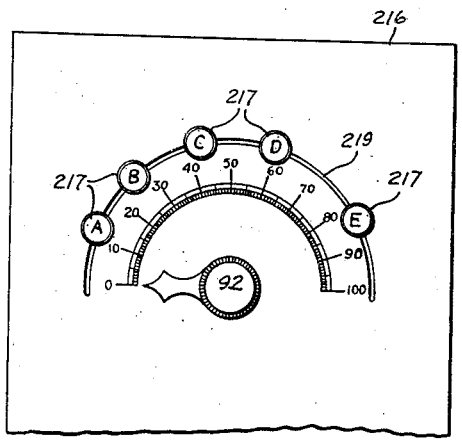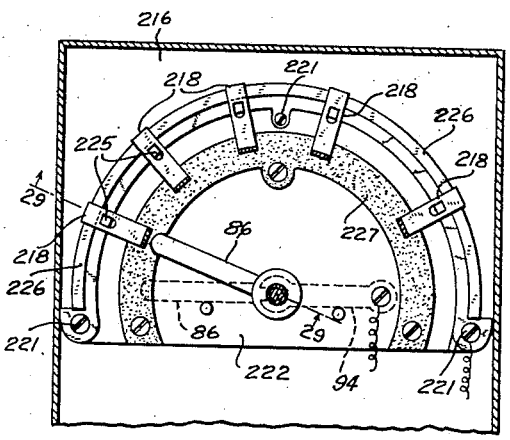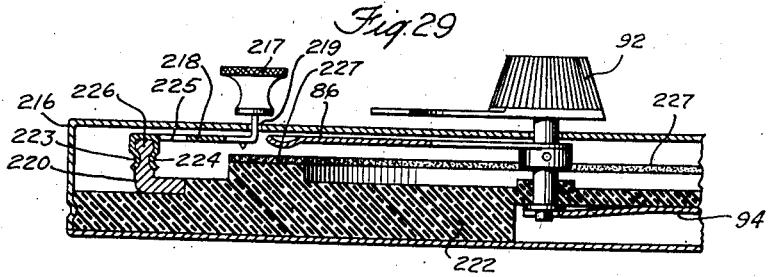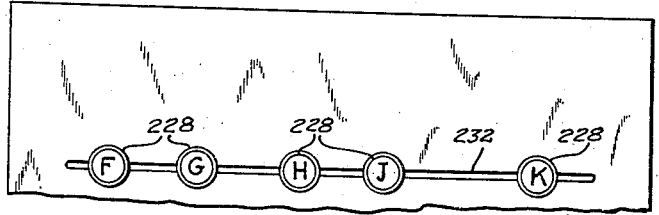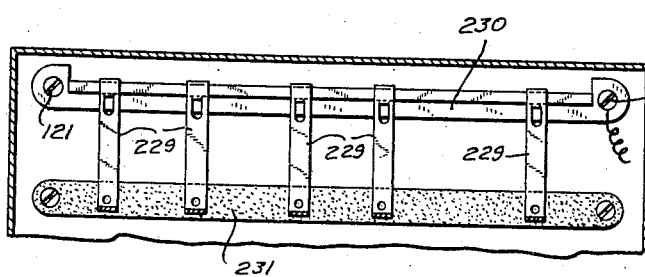

Patented Aug. 13, 1935

2,010,904

UNITED STATES PATENT OFFICE 2,010,904

REMOTE CONTROL APPARATUS FOR RADIORECEIVERS

Adolph A. Thomas, New York, N. Y.

Application March 24, 1930, Serial No. 438,312

20 Claims. (Cl. 172—239)

My invention relates to the art of receiving radio broadcasts and its object is to provide novel means for controlling the operation of a radio receiver at a distance. The remote tuning system of my invention is characterized by simplicity of structure for tuning in any station without the need of individual controlling switches in the receiver. I require only one controlling switch to stop the tuning shaft in selected position, and this tuning switch, as I may call it, is movably mounted in such a way that the moment of its closing (or opening) is predetermined by the strength of current passing through the coil of an electromagnet operating device. In a remote control box is a rheostat or equivalent means for regulating the current strength in the switch-controlling coil by a movable finger piece or a set of push buttons. The remote control box is operatively connected to the receiver by an electric cable which contains only a few wires of low voltage.

In one form of my invention, the tuning switch comprises a contact movable with the tuning shaft and a second contact movable to a selected position by an electromagnetic coil. The position of the second contact, which moves independently of the tuning shaft, is controlled by regulating the curent strength in the coil, as previously mentioned. In other words, the position of the second contact in relation to the first contact determines the position in which the tuning shaft stops. When the two contacts meet, they energize a relay to open the circuit of the electric motor that drives the tuning shaft. The contacts of the tuning switch may be mounted for rotary or rectilinear movement.

It is not necessary that the two contacts of the tuning switch shall be mounted on separately movable supports, for both contacts can be arranged on the same movable member as a unitary switch either normally open or closed. In that case, there is a separate member movable by the electromagnetic coil to a predetermined position in accordance with the strength of the energizing current. When this member encounters the movable switch, the latter is closed (or opened, as the case may be) to break the motor circuit and stop the tuning shaft in position for the selected station.

The electromagnetic device for controlling the operation of the tuning switch may be a solenoid with a movable core and a fixed coil, or it may comprise a coil pivoted in a magnetic field. In either case, the final position of the movable part is controlled by the strength of current passing through the coil, and it is the position of this movable part that determines the position in which the tuning shaft comes to rest. This electromagnetic device is so calibrated that an energizing current of given value causes a certain station to be tuned in, and an indicator on the remote control box enables the operator to select the station he wants. The position of the indicator corresponds to the strength of current passing through the switch-controlling coil in the receiver.

When the selected station is in tune, the operator releases the knob or key on the control box and all circuits of the tuning system are automatically opened, so that no current is wasted. In one embodiment of my invention, the remote control box has only two rotary knobs: one regulates the loudspeaker volume and the other performs the double function of a power switch and rheostat control. When this second knob is in "off" position, the main switch in the receiver is open and the power circuit is disconnected. Instead of having a rotary knob to control the rheostat for tuning in any station on the dial, I may use a set of keys or push buttons representing each a selected station. Each key controls a contact arm adapted to engage the resistance element at such a point that a current of requisite value passes through the switch-controlling coil in the receiver. In other words, when a key is operated, the tuning shaft stops in correct position for the particular station represented by the key. I may also combine a set of automatic tuning keys for certain stations with a dialing knob for any station.

The various novel features and practical advantages of my remote tuning apparatus will be understood from a description of the accompanying drawings which depict several embodiments of my invention. In these drawings—

Figure 1:
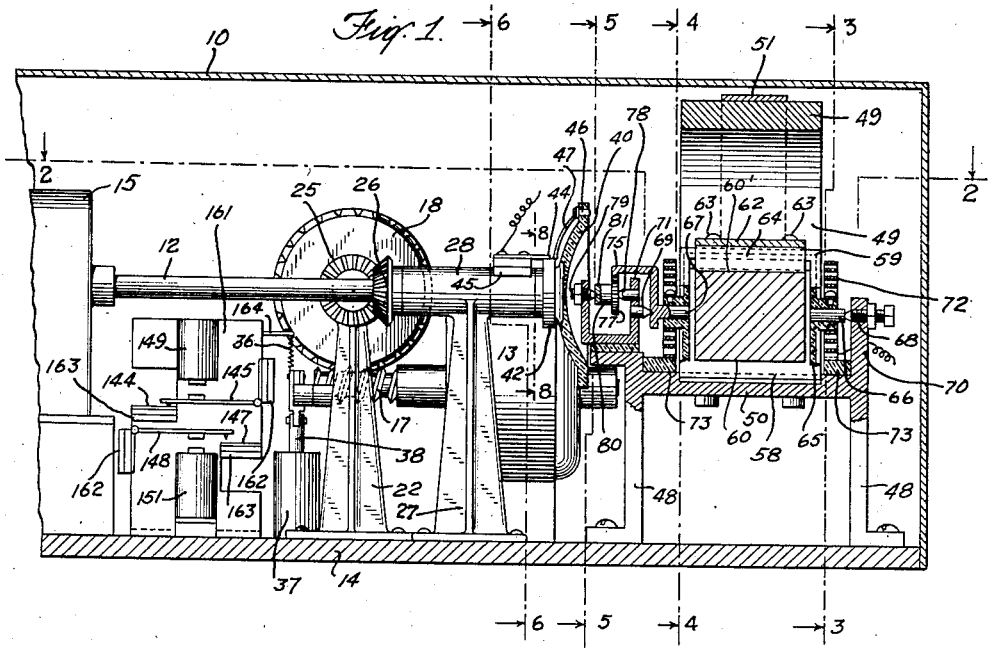
Fig. 1 represents a side elevation, partly in section, of the tuning mechanism inside the receiver.
Figure 2:
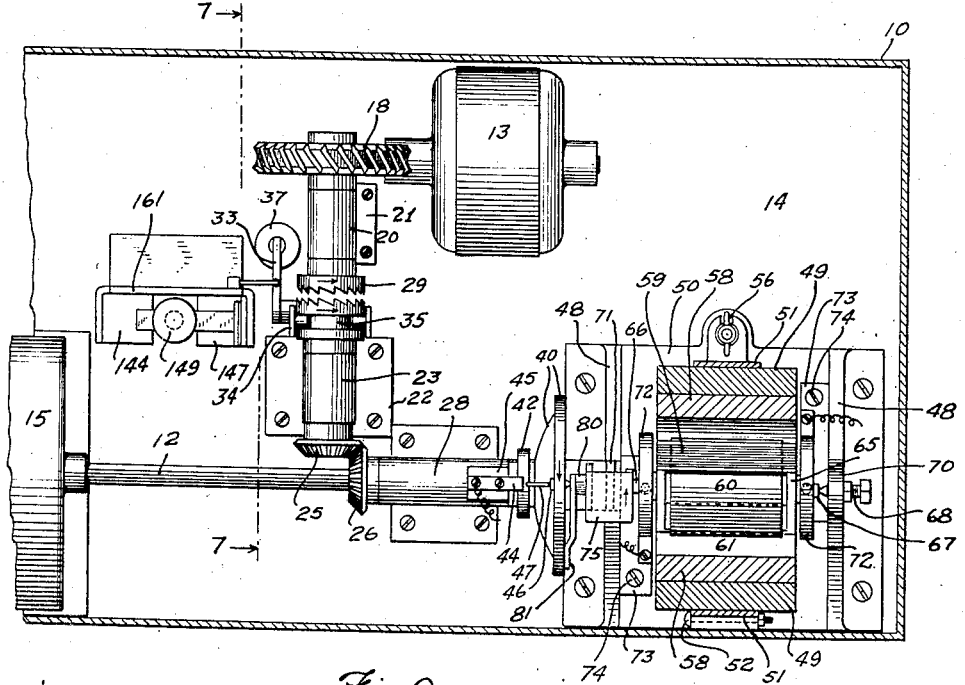
Fig. 2 is a plan view on section line 2—2 of Fig. 1.
Figure 13:
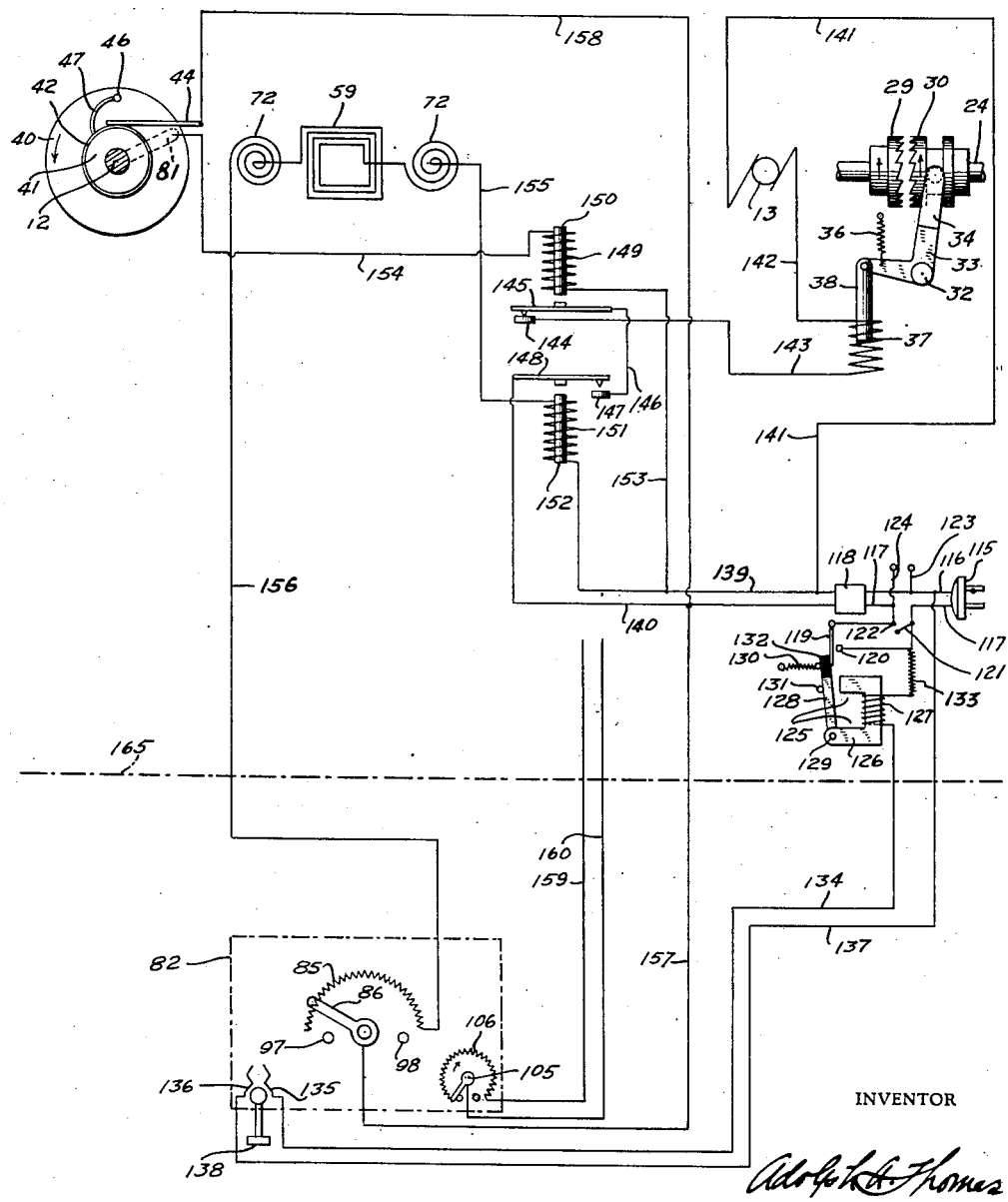
Figure 17:
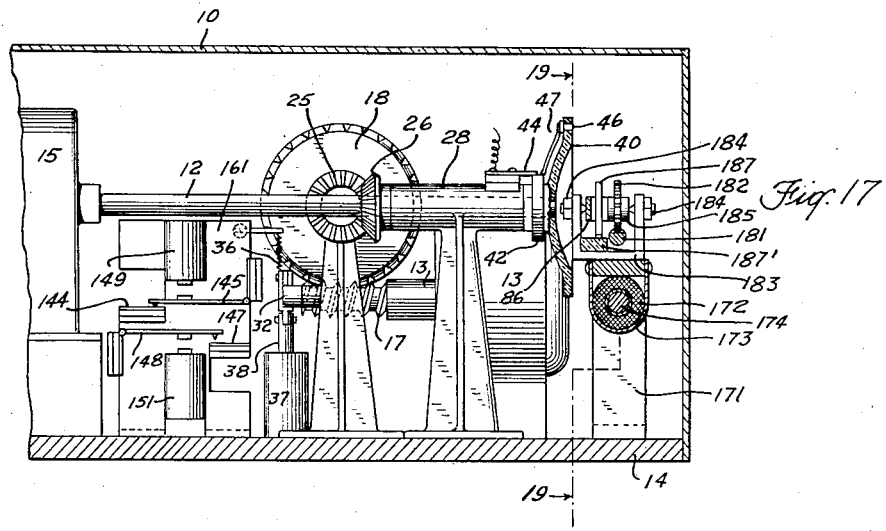
Figure 18:
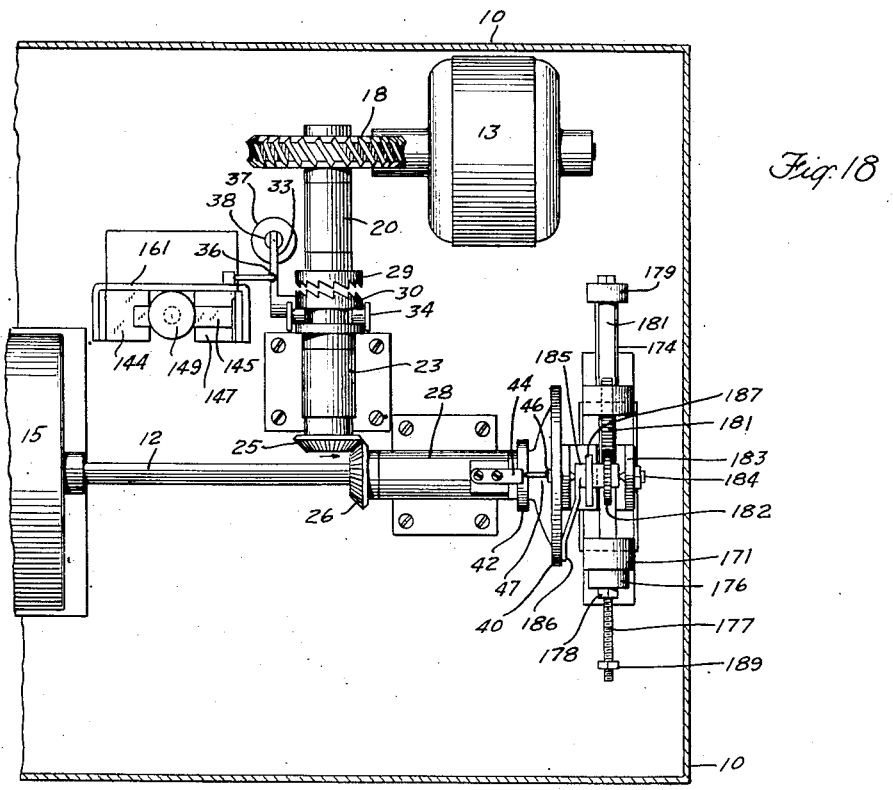

Figs. 3, 4, 5 and 6 are sectional views on lines 3—3, 4—4, 5—5 and 6—6, respectively, of Fig. 1, to show various details of the remotely controlled electromagnetic device associated with the tuning shaft;

Fig. 7 shows a transverse section on line 7—7 of Fig. 2;

Fig. 8 is a section on line 8—8 of Fig. 1;

Fig. 9 is an enlarged section on line 9—9 of Fig. 8;

Fig. 9a is a sectional detail similar to Fig. 9 and showing a modified form of switch contact mounted adjustably on an insulating disk;

Fig. 10 is an elevational view of one form of remote control box, the cover being partly broken away to show certain parts inside;

Fig. 11 shows a plan view of the same box with the outer casing broken away and some parts being sectioned for clearness;

Fig. 12 is a cross-section on line 12—12 of Fig. 10;

Fig. 13 is a diagram of circuit connections between the remote control box and the radio receiver;

Fig. 14 shows in elevation another form of remote control box;

Fig. 15 is a view similar to Fig. 14, with the cover broken away to reveal the inside mechanism;

Fig. 16 is an enlarged section on line 16—16 of Fig. 15;

Fig. 17 represents, in side elevation, a radio receiver equipped with a modified form of remotely controlled electromagnetic device, the latter being partly sectioned for clearness;

Fig. 18 is a plan view of Fig. 17;

Fig. 19 is a section on line 19—19 of Fig. 17;

Fig. 20 is a diagram of circuit connections for the remote control box of Figs. 14-16 and the electromagnetic device of Figs. 17-19;

Fig. 21 illustrates in plan a modified form of switch structure controlled by the electromagnetic device of Figs. 17-19;

Fig. 22 is a section on line 22—22 of Fig. 21;

Fig. 23 is a plan view of another form of switch structure controlled by the associated electromagnetic device;

Fig. 24 is a section on line 24—24 of Fig. 23;

Fig. 25 is a diagram of circuit connections for the electromagnetic switch mechanism of Figs. 23-24;

Fig. 26 shows still another form of tuning switch comprising a pair of independently slidable contacts;

Fig. 27 is an elevational view of a remote control box having automatic tuning keys in addition to a rotary tuning knob, a portion of the box being broken away for lack of space;

Fig. 28 is an inside view of the box shown in Fig. 27;

Fig. 29 is an enlarged section on line 29—29 of Fig. 28;

Fig. 30 shows another form of remote control box with automatic tuning keys; and Fig. 31 is an inside view of the box shown in Fig. 30.

I shall first describe the mechanism shown in Figs. 1-9. The radio receiver contained in cabinet 10 has a tuning shaft 12 which is driven by a small electric motor 13 mounted on the base plate 14 of the cabinet. The shaft 12 controls suitable tuning elements which are usually variable condensers arranged in gangs. In Figs. 1 and 2 the tuning elements are diagrammatically indicated at 15, and no further description thereof is necessary. It will be understood that when I refer to shaft 12 as a tuning shaft, I do not necessarily mean that it carries all or any of the tuning elements, for these may be mounted on a separate shaft operatively connected to shaft 12. I call this the tuning shaft to indicate that its operation controls the variable tuning elements of the receiver, irrespective of where or how they are mounted. The motor shaft 16 carries a worm or spiral pinion 17 arranged in mesh with a gear wheel 18 fixed on one end of a rotary shaft 19, which is supported in a bearing 20 on top of a stand 21 secured to base 14. A second stand 22 has a bearing 23 for supporting a rotary shaft 24 in axial alignment with shaft 19. A bevel pinion 25 fixed on one end of shaft 24 engages a bevel pinion 26 on the tuning shaft 12, one end of which is journalled in a horizontal bearing 28 on a post or stand 27.

Referring to Fig. 7, there is a clutch member 29 fixed on one end of shaft 19 and a slidable clutch ring 30 is keyed on one end of shaft 24. A lateral projection 31 on stand 22 carries a pin 32 on which a bellcrank 33 is pivoted. The upper arm of bellcrank 33 terminates in a yoke 34 adapted to engage in a circumferential groove 35 of clutch ring 30. A contracting coil spring 36 normally holds the bellcrank 33 in such position that the clutch ring 30 is out of engagement with clutch member 29, so that the motor 13 is disconnected from the tuning shaft 12. When the bellcrank 33 is rocked counterclockwise (as viewed in Fig. 7), the teeth of clutch ring 30 interlock with the teeth of clutch member 29, whereby the shafts 19 and 24 become coupled and the motor drives the tuning shaft 12. The bellcrank 33 is actuated by a solenoid comprising a coil 37 and a reciprocable magnetic core 38, which is connected to one end of bellcrank 33 by a pivoted link 39. When coil 37 is energized, the clutch ring 30 is moved to coupling position, and when the coil is de-energized, the tensioned spring 36 instantly moves the clutch ring to normal inoperative position. The transmission ratio between motor 13 and tuning shaft 12 is so calculated that the shaft is driven at the requisite low speed. In the present instance, the shaft 12 rotates always in the same direction. If the receiver has condensers that operate only through an arc of 180 degrees and require reversal of movement when minimum and maximum capacity is reached, it is only necessary to interpose a suitable automatic reversing mechanism R between the motor-driven shaft 19 or 24 and the tuning shaft 12, as diagrammatically indicated in Fig. 21. It will be understood that the reversing mechanism R is applicable to any one of the various modifications shown in the drawings. This automatic reversal of the tuning shaft at each end of the dial may be effected either by reversing the rotation of the motor shaft through a reversing switch, or by interposing mechanical reversing connections. Examples of both forms of reversing connections for tuning shafts are set forth in certain of my copending applications, such as Serial Number 338,391.

One end of the tuning shaft 12 carries an insulating disk 40 which is provided with a hub 41 for supporting a contact ring 42 of brass or other good conducting metal. A set-screw or cross-pin 43 secures the disk 40 in proper position on shaft 12. The disk 40 and hub 41 may be molded as a single piece of bakelite, fiber, pyralin, or other suitable material. A contact finger 44 is mounted on an insulating block 45, which may conveniently be supported on bearing sleeve 28, and the free end of the arm is in firm pressure contact with the metal ring 42 on disk 40. A contact 46 is fixed in disk 40 near its periphery so as to project slightly beyond the face of the disk, as indicated in Fig. 9. A suitable conductor 47 connects the contact 46 electrically with ring 42. This conductor may be an ordinary flexible wire, or it may be a stiff metal strip soldered at its ends to the contact members 42 and 46. The correct angular position of contact 46 is determined by adjusting the insulating disk 40 before tightening the set-screw or cross-pin 43. Instead of mounting the contact 46 in fixed position on disk 40, I may use a contact clip 46' (see Fig. 9a) adapted to be slipped over the edge of disk 40 and adjusted circumferentially to correct position. The clip 46' is of spring metal and snaps into the circumferential grooves 40' of disk 40 in tight frictional engagement.

which holds the clip against movement out of adjusted position.

The base plate 14 of the radio cabinet carries a non-magnetic frame indicated as a whole by 48, which supports a U-shaped permanent magnet 49. The frame 48 has a platform 50 on which the ends of the magnet rest. A strap 51 hinged at 52 surrounds the magnet and is held tight by a bolt 53 hinged at 54 to the platform 50. The strap 51 terminates in a lateral extension 55 provided with a slot 56 for receiving the bolt 53. By tightening the wing-nut 57, the strap 51 is tensioned to hold the magnet 49 rigidly in place. Any other practical supporting means for magnet 49 may be used. The pole pieces 58 of the magnet are shaped to provide a cylindrical space in which a pivoted coil 59 is operatively supported. A cylindrical core 60 of soft iron is preferably inserted in the air space between the pole pieces to concentrate the magnetic flux through the coil. The pole pieces 58 and magnetic core 60 form an angular airgap 61 in which the side turns of coil 59 are free to swing in either direction. The core 60 is supported in any practical way, as by means of a non-magnetic plate 62 attached to the top of pole pieces 58 by screws 63. The plate 62 is provided with a rib 64 adapted to enter an axial slot or groove 60' in core 60. The connection between rib 64 and slot 60' is sufficiently firm to hold the core securely in concentric relation to the polar faces of the magnet.

The coil 59 is wound on a rectangular non-magnetic frame 65, which may be formed of aluminum or insulating material like stiff moisture-proof paper, fiber and others. The frame 65 carries a pair of axially aligned shafts 66 and 67, which are recessed at their outer ends for receiving pointed pins or set-screws 68 and 69, respectively. The adjustable set-screw 68 is mounted on an upright extension 70 of framework 48 and the pointed pin 69 is carried by an insulated U-shaped bracket 71 also mounted on the frame. This is clearly shown in Fig. 1. The coil frame 65 is connected at opposite ends to a pair of spiral springs 72. The fixed ends of these springs are connected to insulating blocks 73, which are secured to platform 50 by screws 74 or otherwise. The spiral springs 72 are oppositely arranged and so adjusted as to hold the coil 59 normally in the position shown in Fig. 4. It is convenient to use the insulated springs 72 as conductors for leading the current through the coil, and the ends of the coil are therefore connected to the springs, as diagrammatically indicated in Fig. 13. The shaft 67 of coil frame 65 carries an extension 75, which terminates in a gear sector or arcuate rack bar 76 arranged to mesh with a pinion 77 rotatably mounted between two aligned bearing pins 78 and 79 on bracket 71. The pin 79 may be in the form of an adjustable set-screw. The hub 80 of pinion 77 carries a contact arm 81 arranged to engage the insulated contact 46 on disk 40.

Figure 4:
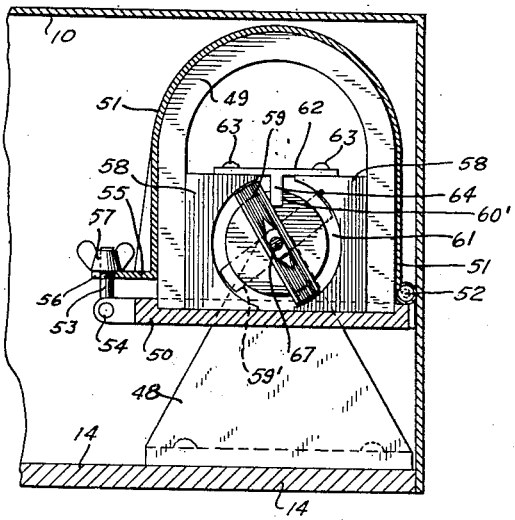
Figure 3:
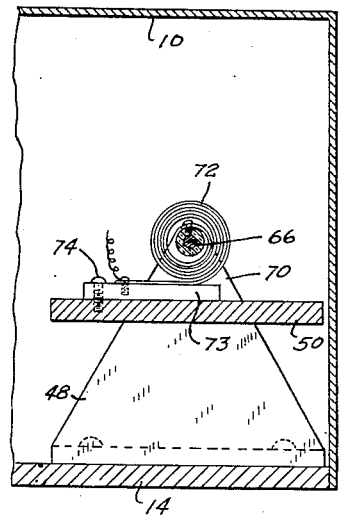
Figure 5:
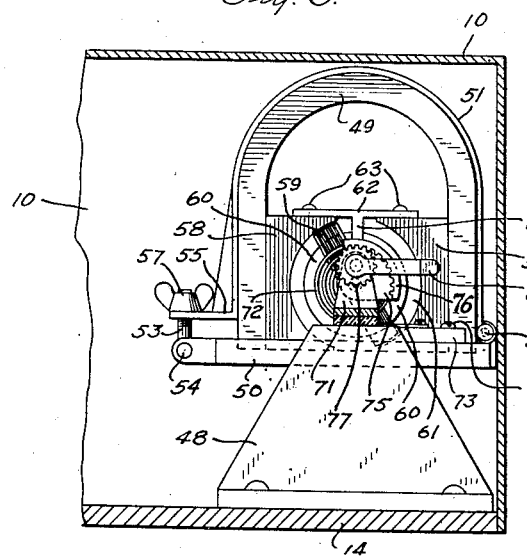
Figure 6:
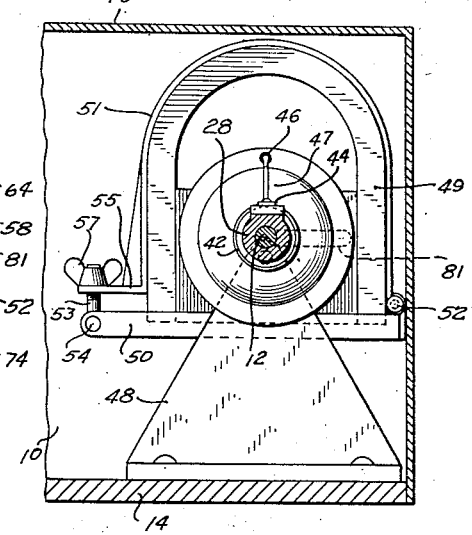

The transmission ratio between coil shaft 66—67 and contact arm 81 is 2:1, so that the arm rotates through approximately half a revolution when the coil 59 swings through an arc of 90 degrees. In Fig. 4 the maximum movement of coil 59 is from normal position to the right-angled position indicated by the dotted outline 59', and it is assumed that the 180 degree arc of travel of contact arm 81 takes in the entire broadcasting scale. If the coil 59 is mounted to swing through half a revolution, the multiplying gear connection 76—77 is not necessary. As seen in Fig. 1, the pivot axis of the rotary contact arm 81 is substantially in axial alignment with tuning shaft 12, whereby the rotary contact members 46 and 81 move about a common center. The arm 81 is preferably of spring metal adapted to press firmly against contact 46. It is clear that the independently movable contacts 46 and 81 constitute a switch adapted to be closed when they reach the same angular position, which is predetermined from the remote control box, as will be explained in due course. The rotary contact 46 need not be mounted directly on shaft 12, for it is sufficient to have the contact move in unison with the shaft, no matter how the contact may be supported. The angular position of arm 81 depends upon the strength of current passing through coil 59, and the strength of the energizing current is regulated in accordance with the station to be tuned in. This current regulation is effected by means of a remote control box which I shall now describe.

Referring to Figs. 10, 11 and 12, there is a small flat box indicated as a whole by 82 which comprises an insulating base 83 and a removable cover 84. The box 82 contains a rheostat comprising a resistance 85 and a rotary contact arm 86. The resistance element 85 may be a coil of fine wire wound closely on a circular insulating strip 87, and a simple way to hold this coil in position is to set it into a semi-circular slot 88 in an insulating block or disk 89 on base 83. The wire-wound strip 87 may fit so tightly into slot 88 that no additional fastening means is required. The insulating disk 89 carries a binding post 90 to which one end of resistance coil 85 is connected. In place of a wire resistance, I may use a resistance composed of graphite or other composition having comparatively high electrical resistance suitable for the purpose of this invention. The contact arm 86 is fixed on a rotary shaft 91 which carries on its outer end a knob or other suitable finger piece 92, preferably of insulating material. The inner end of shaft 91 extends into a recess 93 in block 89, and a conducting spring strip 94 secured in the recess is connected to the projecting end of shaft 91 by a cross-pin 95 or otherwise. The shaft 91 is therefore always in good electrical contact with conductor 94. A binding post 96 on the insulating block 89 is electrically connected with strip 94, so that the rheostat arm 86 is connected in circuit by merely attaching a conductor to the binding post.

The rheostat arm 86 is normally held out of contact with resistance 85 by the spring blade 94, but is pressed against the resistance when the knob 92 is pushed in. In other words, the rheostat members 85 and 86 also constitute a normally open switch. The movement of rheostat arm 86 is limited to half a circumference by a pair of fixed stops 97 and 98. When the arm 86 lies against stop 97, a maximum amount of resistance is included in the circuit of coil 59, and when the arm 86 encounters the stop 98 at the other end of its movement, the amount of resistance in the coil circuit is a minimum. The rheostat shaft 91 carries an indicator plate or disk 99 provided with a scale 100 on which the broadcasting stations are suitably indicated. It is customary to divide these scales into one hundred equal divisions, and I have followed this practice in Fig. 10 where the scale is in zero position. A window 101 in the top of box 82 permits reading of the indications on disk 99. To facilitate the tuning in of the stations used most frequently, the dial plate 99 may have those stations identified by their call letters.

Most radio receivers of the present day are operated from the house-lighting circuit, and the electric power is turned on and off by a main switch. The remote control box 82 of Figs. 10, 11 and 12 is also provided with a suitable power switch 102 operated by a toggle lever 103 or otherwise. It will not be necessary to show or describe the structural details of switch 102, because such switches are well known and obtainable in the open market. The volume of loudspeaker reproduction is regulated from the remote control box by simply turning a knob 104 which operates a rheostat arm 105. A circular resistance element 106 mounted on an insulating disk 107 is engaged by contact arm 105 to vary the amount of resistance included in the loudspeaker circuit. One end of resistance 106 is connected to the binding post 108, and a second binding post 109 is electrically connected to contact arm 105 by a conducting strip 110. Two fixed stops 112 and 113 on disk 107 limit the movements of rheostat arm 105, which is carried by a rotary shaft 114 operated by knob 104.

Fig. 13 indicates diagrammatically the operative connections between the radio receiver and the remote control box 82. A plug 115 adapted to be inserted in an ordinary house-lighting socket has a pair of leads 116 and 117 which may be connected to a suitable voltage-reducing device 118. The service main 117 includes a switch comprising a movable arm 119 and a stationary contact 120. The arm 119 may be a spring blade which normally tends to remain in open position. The normally open switch 119—120 is shunted by a hand-operable switch comprising a movable contact member 121 and a fixed contact 122, which constitute the main power switch of the receiver. Two branch conductors 123 and 124 lead into the radio cabinet where they are properly connected in the system of the receiver, as will be understood without explanation. The switch arm 119 is controlled by an electromagnetic relay indicated as a whole by 125 and comprising a magnetic field frame 126, a magnetizing coil 127 and a movable armature 128 pivoted to the field frame at 129. The armature 128 is normally held by a contracting coil spring 130 against a fixed stop 131 away from the field frame 126. An insulating extension 132 on armature 128 engages the free end of spring arm 119, so that the latter is moved to closing position against contact 120 when coil 127 is energized. One side of relay coil 127 is connected to lead 117 through a resistance 133 for reducing the voltage through the coil. The other side of coil 127 is connected by a wire 134 to a switch terminal 135 in the remote control box 82. The other switch terminal 136 is connected by a wire 137 to the service main 116. The switch terminals 135—136 are adapted to be electrically connected by a hand-operable plug 138. It may be assumed that the switch parts 135, 136 and 138 in Fig. 13 are a diagrammatic representation of the main switch 102 in the remote control box.

Two conductors 139 and 140 lead from the voltage-reducing device 118. A wire 141 connects one side of motor 13 to conductor 139, and the other side of the motor is connected to one end of clutch coil 37 by a wire 142. The other end of coil 37 is connected by a wire 143 to a stationary switch contact 144, which is normally engaged by a movable contact arm 145. A wire 146 connects the switch arm 145 with a stationary contact 147. A movable contact arm 148 associated with contact 147 is connected to conductor 140. The movable switch arms 145 and 148 may be in the form of spring blades so mounted and tensioned that the arm 145 normally engages its contact 144, while the other arm 148 is normally out of engagement with the adjacent contact 147. It will be seen that the normally closed switch 144—145 and the normally open switch 147—148 are connected in series in the circuit of the electric motor 13 and clutch coil 37, so that both switches must be closed to energize the motor and connect the driving shaft 24 with the motor-driven shaft 19.

The normally closed switch arm 145 is controlled by an electromagnet comprising a coil 149 and a magnetic core 150. Similarly, the normally open switch arm 148 is controlled by a coil 151 wound on a magnetic core 152. When coil 149 is energized, the arm 145 is attracted and disengages contact 144 to open the circuit of motor 13 and coil 37. When coil 151 is energized, the arm 148 is moved into engagement with contact 147 to close the circuit of motor 13 and clutch coil 37, assuming the switch 144—145 to be closed. One side of coil 149 is connected by a wire 153 to conductor 139, and the other side of the coil is connected by a wire 154 to the rotary contact arm 81. One side of coil 151 is connected to conductor 139 and the other side of the coil is connected by a wire 155 to one of the conducting springs 72 of coil 59. The other conducting spring 72 is connected by a wire 156 to one end of the rheostat resistance 85 in the remote control box 82. The rheostat arm 86 is connected by a wire 157 to conductor 140. The contact finger 44 which engages the conducting ring 42 on shaft 12 is connected to conductor 140 by a wire 158. One end of the volume-regulating resistance 106 in the remote control box is connected to a conductor 159, and the associated contact arm 105 is connected to a conductor 160. The two conductors 159 and 160 are connected in any practical way to cause a variation in the loudspeaker volume by the control of resistance 106. By way of example, I might suggest that the rheostat 105—106 could be connected across the secondary coil in the first audio frequency stage. It is immaterial through what connections the volume of reproduction is controlled when the knob 104 is turned.

In actual practice, the two coils 149 and 151 together with their associated switches may be mounted on a single supporting panel or bracket 161 secured to the base plate 14 of the radio cabinet, as shown in Figs. 1 and 2. The spring arms 145 and 148 are mounted on lateral projections or ears 162, and the stationary contacts 144 and 147 are supported on lateral projections 163. The two pairs of projections 162 and 163 may conveniently be formed integral with panel 161, which may be of sheet metal or insulating material. If the panel is made of metal, the supported switch contacts must be properly insulated. The panel 161 may also carry an arm 164, to which one end of spring 36 is attached.

In using the remote control box, the operator first moves the finger piece 103 to "on" position to close the main switch 102, which is diagrammatically represented in Fig. 13 by switch contacts 135—136 and finger piece 138. The closing of contacts 135—136 energizes the relay coil 127 and causes the movable armature 128 to close the switch arm 119 in the radio cabinet. The electric power for the radio receiver is now on, and the next step is to select a station by turning the knob 92. Let us say, the operator wants station A: he turns the knob 92 until the identifying indicia of that station appear in the window 101. We may assume that, when the rheostat arm 86 is in the position indicated in Fig. 13, the indicator of the control box points to station A. No circuits are closed by the mere rotation of arm 86, because the latter is normally out of contact with resistance 85. After the operator has adjusted the tuning knob 92, he pushes it in and closes the circuit through coils 59 and 151, as follows: starting with conductor 139, we go through coils 151 and 59 in series, through cable wire 156, resistance 85, contact arm 86 and through wire 157 to the return conductor 140. The energized coil 151 instantly closes the switch arm 148 so that the circuit is closed through the windings of motor 13 and coil 37 as follows: starting with conductor 139, we go through motor 13 and coil 37 in series, wire 143, normally closed switch contacts 144—145, wire 146, switch contacts 147—148 which are now closed by the action of coil 151, and to the return conductor 140.

The energizing of motor 13 and coil 37 connects the tuning shaft 12 with the driving shaft, and the disk 40 is now slowly rotated. The energizing of coil 59 causes the same to swing in the magnetic field until the electromagnetic action of the coil is counterbalanced by the two tensioned springs 72. The contact arm 81 therefore stops in a position depending on the current strength in coil 59. We may assume that for station A the switch arm 81 stops in the position indicated in Fig. 13. The tuning shaft 12 carries the contact 46 around with it until the contact encounters the arm 81, whereupon the coil 149 is energized through the following connections: conductors 139 and 153, coil 149, wire 154, arm 81, contact 46, collector ring 42, brush 44, and through wire 158 to the return conductor 140. The energizing of coil 149 opens the switch arm 145 and breaks the circuit of motor 13 and clutch coil 37. Therefore, the moment when the independently movable switch members 46 and 81 meet, the tuning shaft stops and remains in tuning position for the selected station.

The above operation takes place for any position of rheostat arm 86 in the remote control box 82. The resistance 85, coil 59 and springs 72 are so calibrated that the switch arm 81 actuated by coil 59 stops in correct tuning position for the station represented by the position of arm 86. This calibration lies within the skill of the electrical expert. The volume of reproduction is regulated by merely turning the knob 104 one way or the other. As soon as the operator hears the selected station, he releases the knob or button 92, whereupon the circuits of coils 37, 59, 149 and 151 are automatically opened, so that no current is wasted. The only coil that remains energized as long as the switch contacts 135—136 remain closed, is the relay coil 127, but that consumes a negligible amount of current. If the rotating contact 46 should meet the contact arm 81 before the latter has come to rest position, the motor and clutch circuits will be momentarily interrupted, but the arm 81 will continue to move until it reaches its predetermined position. As soon as the two contacts are separated, the motor 13 and clutch coil 37 are again energized and the tuning shaft 12 continues to rotate until the contact 45 meets the adjusted arm 81. Thereupon the tuning shaft stops for good in preselected position until the next station is tuned in. Attention is called to the fact that only six wires of low voltage are contained in the electric cable connecting the remote control box with the radio receiver. These six wires cross the imaginary line 165 in Fig. 13, which has been drawn merely to indicate visually that all wires crossing that line are housed in the connecting cable. Since all wires in the cable are of low voltage, no arcing in the remote control box is possible, and all danger due to high voltage is eliminated.

Figs. 14, 15 and 16 show a modified form of remote control box in which the rheostat arm also controls the main power switch, so that the separate finger piece 103 of Figs. 10 and 11 is eliminated. To avoid needless repetition of description, all parts common to Figs. 10—12 and 14—16 are designated by like reference characters. In other words, the previous description of Figs. 10, 11 and 12 applies as far as possible to Figs. 14, 15 and 16. The rheostat arm 86 in Fig. 15 carries an insulating lug or extension 166 arranged to engage a spring finger 167 when the arm rests against stop 97. The spring finger 167 is mounted at one end on the insulating base 89 and normally tends to engage the fixed contact 168. The tuning knob 92 carries a pointer 169 arranged to move over the scale 170 on top of the box. When the pointer 169 is in "off" position, the rheostat arm 86 inside the box rests against the stop 97 and holds the spring finger 167 open. When the rheostat arm 86 is moved over the resistance 85, the released spring finger 167 automatically moves to closed position and completes the circuit through relay coil 127. In other words, the switch 167—168 of Fig. 15 takes the place of the separately operated switch 102 in Figs. 10 and 11 and is connected to relay 125 in the same way as contacts 135—136 in Fig. 13.

The spring finger 167 is sufficiently wide to be engaged by the lateral extension 166 of arm 86 even if the knob 92 should be pushed in when the pointer 169 is in "off" position. The pressure of the contact spring 94 against the rheostat shaft 91, together with the friction of the shaft in the supporting block 89, are sufficient to overcome the light pressure of spring finger 167, so that the latter has not sufficient force to move the rheostat arm away from stop 97. Any other practical connections may be used for holding the switch 167—168 open when the pointer 169 is in "off" position. The electrical connections of the various parts in the control box of Figs. 14, 15 and 16 are the same as those shown in Fig. 13.

Instead of setting the adjustable tuning contact 81 by means of the pivoted armature coil 59, I may use a solenoid having a movable magnetic plunger to which the contact is connected. This modified construction is illustrated in Figs. 17, 18 and 19. It will be noticed that Figs. 17 and 18 differ from Figs. 1 and 2 in that the rotary coil mechanism for setting the contact 81 is replaced by a solenoid device with a reciprocable plunger. Therefore, since the rest of Figs. 17 and 18 is substantially identical with Figs. 1 and 2, I need not repeat the detailed description of the parts common to those four figures. These common parts are indicated by like reference characters, and I shall therefore describe only the solenoid mechanism in Figs. 17 and 18.

A non-magnetic framework 171 mounted on base 14 carries a coil 172, which is held in place by a strap 173 or otherwise. The coil 172 has a magnetic plunger 174 mounted for axial movement. A non-magnetic rod 175 is attached to one end of plunger 174 and connected to a crosspiece 176. The screw-threaded portion 177 of rod 175 has a nut 178 for clamping the cross-piece 176 rigidly to the rod. A second cross-piece 179 is connected to the outer end of plunger 174 by a nut 180 or otherwise, and the upper ends of the two cross pieces are connected to a rack bar 181 arranged in mesh with a pinion 182. A U-shaped bracket 183 fixed on the supporting frame 171 has a pair of adjustable screw bearings 184, between which the pinion 182 is supported for rotary movement in either direction. The hub or shaft 185 of pinion 182 carries a contact arm 186, which corresponds to the arm 81 operated by the pivoted coil 59 of Figs. 1–3. A light coil spring 187 of good conducting metal may be used to connect the arm 186 in circuit during its movements. One end of spring 187 is attached to shaft 185 and the other end of the spring is connected to an insulating block 187' on bracket 183. The spring 187 is not a restoring spring but is used merely as a flexible conductor that may be replaced by any other suitable connection. It is understood that the rotary contact arm 186 is properly insulated. If the supporting frame 171 is of metal and insulated as a whole, no separate insulation is needed for arm 186.

Referring to Fig. 19, a contracting coil spring 188 is connected at one end to the supporting frame 171 and at the other end to a nut 189 on screw rod 177. The cross-piece 176 forms a stop for the movement of plunger 174 under the action of coil spring 188. When the plunger 174 is in normal position, the rack bar 181 holds the insulated contact arm 186 at one end of its arc of travel. That is to say, the normal position of arm 186 corresponds to the zero position of the indicator dial on the remote control box. When the solenoid coil 172 is energized, the magnetic core 174 is drawn in until the electromagnetic action of the coil is counterbalanced by the opposing tension of spring 188. As the plunger 174 is drawn into the coil, the rack bar 181 rotates the contact arm 186 counterclockwise (as viewed in Fig. 19), and the position of this arm depends upon the strength of current passing through coil 172.

Fig. 20 illustrates diagrammatically the circuit connections between the control box of Figs. 14–16 and the radio receiver provided with the solenoid mechanism of Figs. 17–19. It will not be necessary to describe Fig. 20 in detail, because everything that was said in connection with Fig. 13 applies to the other figure. The only difference between the systems in these two figures is that the pivoted coil 59 of Fig. 13 is replaced by the solenoid 172—174, and the relay switch 167—168 in Fig. 20 takes the place of the hand-switch 135—136 in Fig. 13. Similar or corresponding parts in Figs. 13 and 20 are indicated by the same reference characters, so that the circuits previously traced in Fig. 13 can also be traced in Fig. 20 without the need of repetition. When the pointer 169 of Fig. 14 is moved to the desired position on scale 170, the associated rheostat arm 86 allows the switch member 167 to close the circuit of relay coil 127, whereby the main power switch 119 of the radio receiver is closed. When the knob 92 is then pushed in to move the contact arm 86 into engagement with resistance 85, a current of predetermined strength passes through coils 151 and 172 in series, and the plunger 174 moves the contact arm 186 to a certain position representing the station to be tuned in. At the same time, the energized coil 151 closes the switch member 148, whereby the tuning shaft is operatively connected with electric motor 13, as previously explained in connection with Fig. 13. When the rotating contact 46 encounters the adjusted arm 186, coil 149 is energized and opens the circuit of clutch coil 37 and motor 13. The shaft 12 therefore stops instantly in preselected tuning position.

It is not necessary that coil 151 be connected in series with coil 59 of Fig. 13 or with solenoid coil 172 of Fig. 20, for any other suitable connections may be employed for simultaneously energizing those coils. If the coil 151 is connected in series with coil 59 or 172, the current passing through coil 151 will naturally vary in strength, but the electromagnet 151—152 and the associated movable arm 148 are so constructed that the weakest current passing through coil 151 is sufficient to move the switch member 148 to closing position. It goes without saying that the remote control box of Figs. 10, 11 and 12 may be used with the solenoid mechanism of Figs. 18, 19 and 20, and the remote control box of Figs. 14, 15 and 16 may be used with the pivoted coil mechanism of Figs. 1–7. In other words, the remote control box of Fig. 13 may be substituted in Fig. 20, and vice versa.

In the construction previously described, the tuning switches 46—81 of Fig. 13 and 46—186 of Fig. 20 comprise two contacts mounted for independent movement, one contact being movable with the tuning shaft 12 and the other contact being controlled by the tuning coil 59 or 172. It is possible to mount both contacts on the same support. A construction like that is shown in Figs. 21 and 22, where the insulating disk 40 on tuning shaft 12 carries a pair of switch arms 190 and 191. These arms may conveniently be in the form of flat spring blades mounted at one end on an insulating block 192 and arranged to be normally open at their free ends. The block 192 is carried by a U-shaped clamp 193 adapted to be secured to the edge of disk 40 by a set-screw 194 or otherwise. The clamp 193 is radially adjustable, so that the hump or offset 195 on switch arm 190 may be arranged in correct radial position on tuning shaft 12. The switch arm 190 is actuated by a rotary cam disk 196 having a projection 197 which is arranged to engage the hump 195 and force the arm 190 against the associated contact 191 to close the switch.

The cam disk 196 may be operated either by the pivoted coil 59 or the solenoid coil 172. If the armature coil 59 is used, it is only necessary to replace the arm 81 with cam disk 196. In Fig. 21, I have shown the cam disk 196 mounted on the shaft 185 of pinion 182, which is part of the solenoid mechanism previously described in connection with Figs. 17, 18 and 19. The switch members 190 and 191 are electrically connected by conductors 198 to a pair of insulated collector rings 199 and 200 mounted on the hub of disk 40. These collector rings are engaged by a pair of insulated brushes or contact fingers 201 and 202, which may be mounted on the bearing sleeve 28 of tuning shaft 12. The switch members 190 and 191 are connected to conductors 154 and 158 in Figs. 13 and 20. The radial position of cam projection 197 depends upon the strength of the energizing current in coil 59 or 172. When the hump 195 on switch arm 190 encounters the cam projection, the switch 190—191 is closed and the shaft 12 stops in tuning position for the selected station. It is evident that the cam disk 196 can be mounted on the tuning shaft 12, and the normally open switch members 190—191 will then be mounted on a rotary member actuated by coil 59 or 172.

The normally open switch 190—191 may be replaced by a normally closed switch adapted to be opened when it encounters the tuning projection 197 on disk 196. A construction like this is illustrated in Figs. 23, 24 and 25, where the insulating disk 40 of tuning shaft 12 carries a movable switch arm 203 normally engaging a fixed contact 204. These two switch members are connected to collector rings 199 and 200 mounted on the hub of disk 40. The switch arm 203 is mounted at one end on a block 205 attached to one face of disk 40. When the projection 197 on disk 196 strikes the hump or offset 206 on switch arm 203, the latter is moved away from contact 204 to open the circuit of motor 13 and clutch coil 37. This will be clear from the circuit diagram of Fig. 25 in which the coil 151 controls a movable switch arm 207. A wire 208 connects the switch arm 207 with contact 204 on disk 40, and a wire 209 connects one side of clutch coil 37 with a fixed contact 210 associated with switch arm 207. The wire 156 in Fig. 25 is supposed to be connected to one end of the rheostat resistance in the remote control box, as illustrated in Figs. 13 and 20.

When the coils 151 and 172 in Fig. 25 are energized, the switch arm 207 is closed and the cam projection 197 is moved by the solenoid core 174 to a predetermined radial position that represents the selected station. The closing of switch arm 207 energizes the electric motor 13 and the clutch coil 37, so that the switch arm 203 on disk 40 rotates around the disk 196. When the hump 206 of switch arm 203 encounters the radially adjusted projection 197, the arm is thrown open and the circuit of motor 13 and clutch coil 37 is broken. This occurs when the shaft 12 is in tuning position for the station selected by the operator from the remote control box. Otherwise, what has been said about the operation of the systems shown in Figs. 13 and 20 applies to the system of Fig. 25. The tuning projection 197 in Figs. 23, 24 and 25 may also be actuated by electromagnetic mechanism having a pivoted armature coil like the coil 59 in Figs. 1–6. It will be understood that the normally closed switch 203—204 may be mounted on disk 196, and the projection 197 will then be carried by disk 40 or otherwise connected to the tuning shaft 12. The modification of Figs. 23, 24 and 25 has the practical advantage that it dispenses with coil 149 and switch 144—145 in Figs. 13 and 20.

Fig. 26 shows a tuning switch comprising a pair of independently movable contacts 211 and 212 mounted for rectilinear movement and suitably insulated. The contact 211 is carried by a rack bar 213 supported for slidable movement in framework 171. A pinion 214 fixed on a rotary shaft 214' meshes with rack bar 213 and thereby moves the insulated contact 211 in one direction or the other. The shaft 214' rotates in alternately opposite directions in unison with the adjustable tuning elements of the receiver. It is immaterial how the shaft 214' is connected with the electric motor 13, provided the rotation of the shaft is automatically reversed when the contact 211 reaches either end of its line of travel. The contact 212 is mounted on a rod 215 which is attached to the cross pieces 176 and 179 of the solenoid core 174. Otherwise, the solenoid structure of Fig. 26 is the same as that shown in Fig. 19. When the coil 172 is energized by a current of predetermined strength, the magnetic core 174 is drawn in a certain amount and the contact 212 is moved to a position representing the selected station. The shaft 214' continues to rotate until the contact 211 engages the previously adjusted contact 212, whereupon the motor circuit is interrupted and the tuning shaft 12 stops. It will not be necessary to show any circuit connections for the device of Fig. 26, because the reciprocating contacts 211 and 212 are connected in the same way as contacts 46 and 81 in Fig. 13 and contacts 46 and 186 in Fig. 20. In other words, contact 211 is connected to conductor 158 and contact 212 is connected to conductor 154. In the remote control boxes of Figs. 10–12 and Figs. 14–16, the tuning knob 92 moves the rheostat arm 86 to bring in any station within range of the dial. This means that when a person wants a particular station, he has to watch the indicator for the call letters or other identifying notations of the desired station. In every location throughout the United States, it is possible to obtain almost all desirable broadcast programs from a few stations. For this reason I prefer to provide the remote control box with a few automatic tuning keys or buttons in addition to (or in lieu of) the dialing knob 92.

Figs. 27, 28 and 29 show a remote control box having a set of automatic tuning keys or push buttons 217 which are supposed to represent certain stations A–E. By way of example I have shown five buttons, but any other number may be used. The buttons 217 are mounted on the ends of switch arms 218, which project through a narrow semi-circular slot 219 in the cover of the box. The arms 218 may conveniently be shaped from flat spring metal and are mounted on a semi-circular conductor bar or rail 220 which is fastened by screws 221 to the insulating base 222 of the box. The supporting bar 220 may be stamped from a single piece of sheet brass. The spring arms 218 may be adjustably mounted on the curved rail 220, and a simple way of doing this is by means of clamping fingers 223 and 224 formed integral with the arms. The fingers 224 are formed by cutting a slot 225 near the base of each arm 218. The contact rail 220 may be formed with a narrow section or neck 226 which the spring fingers 223 and 224 grip on opposite sides, as clearly shown in Fig. 29. The arms 218 are firmly held by friction in any radially adjusted position, and yet it is easy to change any arm to another position for a different station. If the arms 218 are not intended to be radially adjusted, the arcuate slot 219 is not necessary. The buttons or keys 217 are separable from arms 218 to permit removal of the cover, if that should be necessary.

Still referring to Figs. 28 and 29, the insulating base 222 carries a circular strip of resistance material 227, which may be a graphite mixture or a coil of closely wound resistance wire. The rheostat arms 218 are normally held by inherent tension out of engagement with resistance element 227. When the operator wants to tune in any one of the stations A–E, he merely presses the button that represents the desired station, whereupon the same operations take place as previously described in connection with the circuit diagrams of Figs. 13, 20 and 25. In addition to the automatic tuning buttons 217, I may also use the dialing knob 92 which moves the rheostat arm 86 over the resistance 227 for any station that may be broadcasting.

In the modification of Figs. 30 and 31, the tuning buttons 228 representing stations F–K operate rheostat arms 229 which are mounted on a straight conducting rail or bar 230. The free ends of arms 229 make contact with a resistance element 231 when the keys or buttons 228 are pushed in. The resistance member 231 may be a coil of closely wound wire or a strip of resistance material like graphite. The outer ends of arms 229 project through a straight slot 232 in the top of the box. It may be assumed that the individual rheostat arms 229 are adjustably mounted on bar 230 in the same manner as the radially arranged arms 218 in Figs. 28 and 29. If the arms 229 are not intended for adjustment along the supporting bar 230, the slot 232 is not necessary. The remote control boxes of Figs. 27–31 are also provided with an on-off switch and a volume control knob, as previously explained in connection with the other control boxes.

Although I have shown and described certain specific constructions, I want it understood that my invention is not limited to the details set forth. It is to be expected that changes and modifications will occur to others within the scope of the appended claims. Also, some features of the invention may be used without others, so that all of them need not be embodied in a single apparatus or system.

I claim as my invention:

1. In electric control apparatus, the combination of a shaft, an electric motor for operating said shaft, a member movable with said shaft, a second member movable independently of said shaft to a plurality of positions, a normally closed electric switch carried by one of said members, means on the other member for opening said switch and stopping said motor when said two members reach predetermined relative positions, an electromagnetic device for controlling the position of said second member in accordance with the strength of current which energizes said device, and manually operable means for regulating the strength of said energizing current to predetermine the final position of the second member.

2. The combination of an adjustable shaft, a movable member associated with said shaft, electric mechanism for simultaneously operating said shaft and member, an electromagnetic device including a coil, a second member disconnected from said mechanism and operable by said device to a position depending upon the strength of current in said coil, a switch controlled conjointly by the relative positions of said members to stop said mechanism, a resistance in circuit with said coil, and a set of key-operated contact arms for varying said resistance to regulate the current through said coil, each of said arms representing a selected position of said second member.

3. Apparatus comprising an adjustable shaft, a movable member associated with said shaft, electric mechanism for simultaneously operating said shaft and member, an electromagnetic device including a coil, a second member disconnected from said mechanism and operable by said device to a position depending upon the strength of current in said coil, a switch controlled conjointly by the relative positions of said members to stop said mechanism, a rheostat for regulating the current through said coil, said rheostat including a manually adjustable contact arm which is normally out of engagement with the associated resistance element to keep the circuit of said coil open, and a spring mounting for said arm to permit adjustment of the latter not only along the resistance element but into engagement therewith for closing the coil circuit.

4. The combination of a member movable in alternately opposite directions through a definite path of travel, means for operating said member at substantially constant speed, a second member movable independently of said first member, an electromagnetic device for operating said second member in accordance with the strength of current which energizes said device, the speed and direction of movement of said first member being independent of the operation of said device, means for regulating the strength of said energizing current to predetermine the position of said second member, and means controlled by the position of said second member for stopping said first member.

5. The combination of a shaft adapted to occupy any one of a plurality of predetermined positions, an electric motor for operating said shaft, a member movable with said shaft, a second member movable independently of said shaft and arranged to engage said first member, electromagnetic mechanism for operating the second member to predetermined position, the extent of movement of the second member depending upon the strength of current that energizes said mechanism, a manually controlled rheostat for regulating the strength of said energizing current to predetermine the position of the second member, and switch connections for automatically opening the motor circuit when said members engage.

6. The combination of a rotary shaft, means for operating said shaft through a definite arc in opposite directions, an electromagnetic device for controlling said shaft-operating means in accordance with the strength of current energizing said device, so that the strength of said energizing current determines the position in which said shaft stops, a rheostat for regulating the strength of said energizing current, a rotary finger piece adjustable in opposite directions for controlling said rheostat, the direction of rotation of said shaft being independent of the direction of movement of said finger piece, and an indicator associated with said finger piece to indicate the preselected stopping position of said shaft.

7. The combination of a shaft adapted to rotate through a definite arc in alternately opposite directions, an electric motor for operating said shaft, a member movable with said shaft, a second member movable independently of said shaft, electro-magnetic mechanism for operating the second member to predetermined position, the extent of movement of the second member depending upon the strength of current that energizes said mechanism, a finger piece selectively movable in opposite directions to any desired position, means controlled by said finger piece for regulating the strength of said energizing current to predetermine the position of the second member, the direction of rotation of said shaft being independent of the direction of movement of said finger piece, and means for automatically stopping said motor when said independently movable members occupy certain positions in relation to each other.

8. A remote control box having a set of individually operable push buttons and a rheostat controlled by said buttons, the operation of each button including a certain ohmic value of said rheostat in circuit, in combination with a coil adapted to be energized by an electric current controlled by said rheostat, and a movable member operable to a plurality of different positions depending upon the strength of current in the circuit of said coil, so that the operation of each push button causes said coil to move said member to a predetermined position.

9. A remote control box having a set of individually operable push buttons, a rheostat controlled by said buttons, the operation of each button including a certain ohmic value of said rheostat in circuit, in combination with a coil adapted to be energized by an electric current controlled by said rheostat, a movable member operable to a plurality of different positions depending upon the strength of current in the circuit of said coil, so that the operation of each push button causes said coil to move said member to a predetermined position, and means for adjusting the position of each push button relatively to the rheostat to vary the operative positions of said member in accordance with the position of each button.

10. The combination of an electromagnetic device, a movable part adapted to be actuated by said device to a plurality of predetermined positions, a resistance element adapted to be included in the energizing circuit of said device, a set of spaced contact members associated with said element and normally out of engagement therewith, said members being separately operable to include different ohmic values of said resistance element in the energizing circuit of said device, means whereby the position of said adjustable part depends upon the strength of current in said energizing circuit, each of said members representing a certain position of said movable part, so that the operation of any contact member causes said electromagnetic device to move said part to a preselected position, and mechanism controlled by the final position of said part.

11. The combination of an insulated resistance element, a conducting bar adjacent said element, a plurality of spring contacts mounted on said bar in predetermined spaced relation and normally out of engagement with said resistance element, a plurality of keys or push buttons connected to said contacts for individually operating the latter, each contact when operated including a certain ohmic value of said resistance element in circuit, a rotary shaft adapted to occupy a plurality of different positions, means for operating said shaft, and electromagnetic mechanism for controlling said shaft-operating means, said mechanism being controlled by an electric circuit including said variable resistance element, whereby the position of said shaft is predetermined by the operation of a particular key.

12. The combination of an electromagnetic device, a movable part adapted to be actuated by said device to a plurality of predetermined positions, a resistance element adapted to be included in the energizing circuit of said device, a set of spaced contact members associated with said element and normally out of engagement therewith, said members being separately operable to include different ohmic values of said resistance element in the energizing circuit of said device, means whereby the position of said adjustable part depends upon the strength of current in said energizing circuit, each of said members representing a certain position of said movable part, so that the operation of any contact member causes said electromagnetic device to move said part to a preselected position, a common conducting bar on which said members are mounted so as to be separately adjustable to vary the operative positions of said part in accordance with the position of each member, and mechanism controlled by the final position of said part.

13. In apparatus for controlling the angular movement of a shaft, the combination of a rotary shaft, an electric motor for operating said shaft at substantially constant low speed, a member movable with said shaft, a second member movable independently of said shaft and arranged to engage said first member, an electromagnetic device for actuating the second member to predetermined position, the speed of said motor being unaffected by the speed of operation of said second member, manual means selectively operable, electric means connected with said device and controlled by said manual means to regulate the operation of said device, whereby the position of the second member is predetermined by the selective operation of said manual means, normally open switch mechanism in the electric circuit of said motor, a relay adapted when energized to close said switch mechanism, connections whereby said electromagnetic device and said relay are energized by the operation of said manual means, whereby the motor circuit is not closed until said manual means is operated, and means whereby the engagement of said members automatically breaks the motor circuit and stops said shaft in preselected position.

14. In apparatus for controlling the angular movement of a shaft, the combination of a rotary shaft, an electric motor for operating said shaft at substantially constant low speed, a member movable with said shaft, a second member movable independently of said shaft and arranged to engage said first member, a device for actuating the second member to predetermined position, manual means selectively operable for controlling the operation of said device, whereby the position of the second member is predetermined by the selective operation of said manual means, two series switches in the electric circuit of said motor, one of said switches being normally open and the other switch being normally closed, means for closing said normally open switch by the operation of said manual means, whereby the motor circuit is not closed until said manual means is operated, and means for automatically opening said normally closed switch when said two members engage to break the motor circuit and stop said shaft in preselected position.

15. In apparatus for controlling the angular movement of a shaft, the combination of a rotary shaft, an electric motor for operating said shaft at substantially constant low speed, a member movable with said shaft, a second member movable independently of said shaft and arranged to engage said first member, an electromagnetic device for actuating the second member to predetermined position, manual means selectively operable, electric means connected with said device and controlled by said manual means to regulate the operation of said device, whereby the position of the second member is predetermined by the selective operation of said manual means, two series switches in the electric circuit of said motor, one of said switches being normally open and the other switch being normally closed, a relay adapted when energized to close said normally open switch, connections whereby said electromagnetic device and said relay are energized by the operation of said manual means, whereby the motor circuit is not closed until said manual means is operated, and means for automatically opening said normally closed switch when said two members engage to break the motor circuit and stop said shaft in preselected position.

16. In apparatus for controlling the angular movement of a shaft, the combination of a rotary shaft, an electric motor for operating said shaft at substantially constant low speed, a member movable with said shaft, a second member movable independently of said shaft and arranged to engage said first member, an electrmagnetic device for actuating the second member to predetermined position, manual means selective'y operable, electric means connected with said device and controlled by said manual means to regulate the operation of said device, whereby the position of the second member is predetermined by the selective operation of said manual means, two series switches in the electric circuit of said motor, one of said switches being normally open and the other switch being normally closed, a relay adapted when energized to close said normally open switch, connections whereby said electromagnetic device and said relay are energized by the operation of said manual means, whereby the motor circuit is not closed until said manual means is operated, means for automatically opening said normally closed switch when said two members engage to break the motor circuit and stop said shaft in preselected position, and means whereby the operation of said manual means de-energizes said electromagnetic device and said relay.

17. In apparatus for controlling the angular movement of a shaft, the combination of a rotary shaft, an electric motor for operating said shaft at substantially constant low speed, a member movable with said shaft, a second member movable independently of said shaft and arranged to engage said first member, an electromagnetic device for actuating the second member to predetermined position, a rheostat having manually operable means for controlling the operation of said device, whereby the position of the second member is predetermined by the selective operation of said rheostat, normally open switch mechanism in the electric circuit of said motor, a relay adapted when energized to close said switch mechanism, connections whereby said electromagnetic device and said relay are energized by the operation of said rheostat, whereby the motor circuit is not closed until said rheostat is operated, and means whereby the engagement of said members automatically breaks the motor circuit and stops said shaft in preselected position, said rheostat constituting a normally open switch in the circuit of said device and said relay.

18. In apparatus for controlling the angular movement of a shaft, the combination of a rotary shaft, an electric motor for operating said shaft at substantially constant low speed, a member movable with said shaft, a second member movable independently of said shaft and arranged to engage said first member, an electromagnetic device for actuating the second member to predetermined position, a normally open circuit for said device, a rheostat having manually operable means controlling the operation of said device, whereby the position of the second member is predetermined by the selective operation of said rheostat, two series switches in the electric circuit of said motor, one of said switches being normally open and the other switch being normally closed, a relay adapted when energized to close said normally open switch, connections whereby said electromagnetic device and said relay are energized by the operation of said rheostat, whereby the motor circuit is not closed until said rheostat is operated, means for automatically opening said normally closed switch when said two members engage to break the motor circuit and stop said shaft in preselected position, and means for automatically de-energizing said electromagnetic device and said relay when the operator releases the manually operable means of said rheostat.

19. In apparatus for controlling the angular movement of a shaft, the combination of a rotary shaft, an electric motor for operating said shaft at substantially constant low speed, a member movable with said shaft, a second member movable independently of said shaft and arranged to engage said first member, an electromagnetic device for actuating the second member to predetermined position, manual means selectively operable, electric means connected with said device and controlled by said manual means to regulate the operation of said device, whereby the position of the second member is predetermined by the selective operation of said manual means, two series switches in the electric circuit of said motor, one of said switches being normally open and the other switch being normally closed, a relay adapted when energized to close said normally open switch, connections whereby said electromagnetic device and said relay are energized by the operation of said manual means, whereby the motor circuit is not closed until said manual means is operated, a second relay adapted when energized to open said normally closed switch and thereby break the motor circuit, and connections for automatically energizing the second relay when said two members engage.

20. In apparatus for controlling the angular movement of a shaft, the combination of a rotary shaft, an electric motor for operating said shaft at substantially constant low speed, a contact movable with said shaft, a second contact movable independently of said shaft and arranged to engage said first contact to close an electric circuit, an electromagnetic device for actuating the second contact to predetermined position, manual means selectively operable, electric means connected with said device and controlled by said manual means to regulate the operation of said device, whereby the position of the second contact is predetermined by the selective operation of said manual means, two series switches in the electric circuit of said motor, one of said switches being normally open and the other switch being normally closed, a relay adapted when energized to close said normally open switch, connections whereby said electromagnetic device and said relay are energized by the operation of said manual means, whereby the motor circuit is not closed until said manual means is operated, and a second relay for automatically opening said normally closed switch when said two contacts engage, whereby the motor circuit is broken and said shaft is stopped in preselected position.

ADOLPH A. THOMAS.